(12) United States Patent
Contreras et al.

(10) Patent No.: US 12,415,670 B2
(45) Date of Patent: Sep. 16, 2025

(54) SYSTEMS AND METHODS FOR FLUID BARRIERS THROUGH PERMEABLE STRUCTURES

(71) Applicant: Blue Origin Manufacturing, LLC, Huntsville, AL (US)

(72) Inventors: Eric D. Contreras, San Dimas, CA (US); Satyanarayana Venkata Emani, Glendale, CA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/586,005

(22) Filed: Feb. 23, 2024

(65) Prior Publication Data
US 2025/0270021 A1    Aug. 28, 2025

(51) Int. Cl.
| | |
|---|---|
| B65D 81/20 | (2006.01) |
| B33Y 80/00 | (2015.01) |
| B65D 85/84 | (2006.01) |

(52) U.S. Cl.
CPC ......... *B65D 81/2076* (2013.01); *B65D 85/84* (2013.01); *B33Y 80/00* (2014.12)

(58) Field of Classification Search
CPC ..... B65D 81/2076; B65D 85/84; B33Y 80/00
USPC .......................................................... 141/1
See application file for complete search history.

(56) References Cited

U.S. PATENT DOCUMENTS

| | | | | |
|---|---|---|---|---|
| 3,486,302 | A * | 12/1969 | Paynter ..................... | F17C 9/00 96/219 |
| 4,054,424 | A | 10/1977 | Staudinger et al. | |
| 6,322,756 | B1 | 11/2001 | Arno et al. | |
| 7,763,213 | B2 * | 7/2010 | Miksic ................... | B65D 75/38 53/381.1 |
| 2021/0302103 | A1 * | 9/2021 | Colson .................. | F28F 13/003 |

* cited by examiner

*Primary Examiner* — Craig M Schneider
*Assistant Examiner* — Christopher M Afful
(74) *Attorney, Agent, or Firm* — Hogan Lovells US LLP

(57) ABSTRACT

Systems and methods are directed toward support structures for materials that include one or more flow passages to form a barrier between an inner wall of the support structures and the materials. The one or more flow passages may include ports or pores extending through a fluid-permeable material forming at least a portion of the support structure. A barrier fluid may be introduced at a first side of the inner wall and may be driven, such as using differential pressure, through the inner wall to from a barrier along a second side of the inner wall to reduce a likelihood of contact between the materials and the second side of the inner wall.

20 Claims, 8 Drawing Sheets

SYSTEMS AND METHODS FOR FLUID BARRIERS THROUGH PERMEABLE STRUCTURES

TECHNICAL FIELD

Developments herein relate generally to fluid barriers, and particularly to a gas barrier between a wall of a containment structure and a material positioned within the containment structure.

BACKGROUND

Various fluids may be stored within different containment structures having features such as walls, diverters, baffles, nozzles, and the like. The fluid may damage portions of the structure, for example due to being corrosive or containing particulates/abrasives that scratch or mar surfaces. To address these problems, containment structures may be formed from particularized materials based on the fluid stored therein. For example, corrosive fluids may be stored in stainless steel or titanium containment structures due to the high resistivity to corrosion of those materials. Similarly, abrasive materials may be stored in containment structures that use materials with a high hardness, such as ceramics, hardened steels, and the like. Specialty containment structures may be expensive and have limited use cases due to be designed for particular fluids.

SUMMARY

Developments described herein may include a support structure that includes an outer wall, a fluid-permeable wall, and one or more ports to direct a fluid to the fluid-permeable wall. The fluid-permeable wall may permit a fluid, directed toward the fluid-permeable wall through the one or more ports, to pass through the fluid-permeable wall. The fluid, after passing through the fluid permeable wall, may form a barrier on an opposite side of the wall. The barrier may be positioned between the fluid-permeable wall and a material associated with the support structure. Contact between the fluid-permeable wall and the material may be restricted and/or blocked by the barrier. The fluid-permeable wall may be integrally formed within the outer wall, such as by an additive manufacturing process.

The fluid-permeable wall may include one or more passages or pores that permit the fluid to flow from a first side to a second side. The first side may receive the fluid from the one or more ports. The second side may be proximate to the material associated with the support structure. The one or more passages and/or ports may include flow axes arranged at respective angles with respect to an axis of the support structure. The flow axes may be perpendicular or substantially perpendicular to the axis. The flow axes may also be at one of an acute angle or an obtuse angle with respect to the axis. The flow axes may also be arranged at different azimuthal angles with respect to the axis. The flow axes may also be arranged a combination of various angles to the axis. As fluid flows through the one or more passages and/or pores, the barrier may form along the second side. Additionally, certain configurations may be used to induce agitation, mixing, or stirring of the material. The configurations for agitation, mixing, or stirring may include various azimuthal angle positions of the one or more passages and/or ports.

Systems and methods may include configurations where the fluid is a gas, liquid, solid, plasma, or combinations thereof. The fluid may be mixed with or combined with the material within the support structure. Additionally, the fluid may be used to regulate a temperature of the material. For example, the fluid may be warmer than the material and introduction of the fluid may increase the material temperature. As another example, the fluid may be colder than the material and introduction of the fluid may decrease the material temperature. The fluid may be heated or cooled prior to introduction to the fluid-permeable wall, such as by one or more heat exchangers. The fluid may be used to regulate or maintain a temperature of the material within a range.

In one example, a support structure includes an outer wall and a fluid-permeable inner wall. The support structure also includes one or more ports extending through the outer wall and terminating at the gas-permeable inner wall, wherein the fluid is able to flow through the fluid-permeable inner wall to form a barrier between the inner wall and a material positioned within the support structure.

In one example, a container, includes an outer wall, an inner wall, and one or more ports extending through the outer wall to transport a gas to a first side of the inner wall. The gas is able to flow through the inner wall to form a gas barrier on a second side of the inner wall preventing a material on the second side of the inner wall from contacting the inner wall.

In another example, a method includes forming an outer wall and forming one or more ports extending through the container wall. The method also includes forming an inner wall having one or more openings radially inward from the outer wall and fluidly coupled to the one or more ports. The method further includes causing a gas to flow through the one or more ports and through the one or more openings. The method includes causing the gas to form a gas barrier between the inner wall and a material within the container.

Various embodiments may include a support structure with an outer wall, a fluid-permeable inner wall, and one or more ports. The one or more ports may extend through the outer wall and direct a barrier fluid to the fluid-permeable inner wall. Additionally, the barrier fluid may be able to flow through the fluid-permeable inner wall to form a barrier between the inner wall and a material positioned within the support structure. Furthermore, a first opening having a first flow axis perpendicular to a central axis of the support structure may be included along with a second opening having a second flow axis arranged at at least one of at an obtuse angle or an acute angle to the central axis of the support structure. In one or more configurations, the second opening may have a second opening flow rate configured to induce mixing of the material positioned within the support structure. Additionally, the barrier fluid may be at a barrier fluid temperature that is at least one of greater than or less than the material. Moreover, the barrier fluid may be configured to moderate a material temperature of the material. The material may be a gas, liquid, solid, plasma, or combination thereof and the barrier fluid may be at least one of a gas or a liquid. Also, the material may be at least one of flowing through the fluid support structure or stagnant within the support structure. In at least one embodiment, the one or more components of the support structure are formed using an additive manufacturing process.

Various embodiments may include a container with an outer wall, an inner wall, and one or more ports. The one or more ports may extend through the outer wall to transport a gas to a first side of the inner wall. The gas may be able to flow through the inner wall to form a gas barrier on a second side of the inner wall. The gas barrier may be used to block a material on the second side of the inner wall from contacting the inner wall. The outer wall and the inner wall are integrally formed using an additive manufacturing process in certain configurations. The inner wall may include one or more flow openings. Furthermore, a first density of flow openings at a first portion of the inner wall may be different from a second density of flow openings at a second portion of the inner wall. Also, the one or more flow openings may include a first set of flow openings to form the gas barrier and a second set of flow openings that are configured to drive rotation of the material within the container. The gas may be inert in certain embodiments. Additionally, the container may also include a void between the outer wall and the inner wall to collect the gas. The container may be used for a material that is at least one of a corrosive material or an abrasive material. Also, the outer wall of the container may be formed from a different material than the inner wall. The gas may also be an accelerant that reacts with the material within the container.

Various embodiments may also include a method that may include steps or processes such as forming an outer wall for a containment structure, forming one or more ports extending through the outer wall, forming an inner wall with one or more openings radially inward from the outer wall and fluidly coupled to the one or more ports, causing a gas to flow through the one or more ports and through the one or more openings, and causing the gas to form a gas barrier between the inner wall and a material within the containment structure. The method may also include additional steps or processes, such as causing the gas to mix with the material. The method may also be used with a configuration in which the one or more openings are particularly arranged, based at least, on one or more of an expected pressure or an expected flow rate.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure. As noted above, the drawings as depicted are not necessarily drawn to scale. The relative dimensions and proportions as shown are not intended to limit the present disclosure, unless indicated otherwise. Various embodiments in accordance with the present disclosure will be described with reference to the drawings, in which:

DETAILED DESCRIPTION

Figure 1:
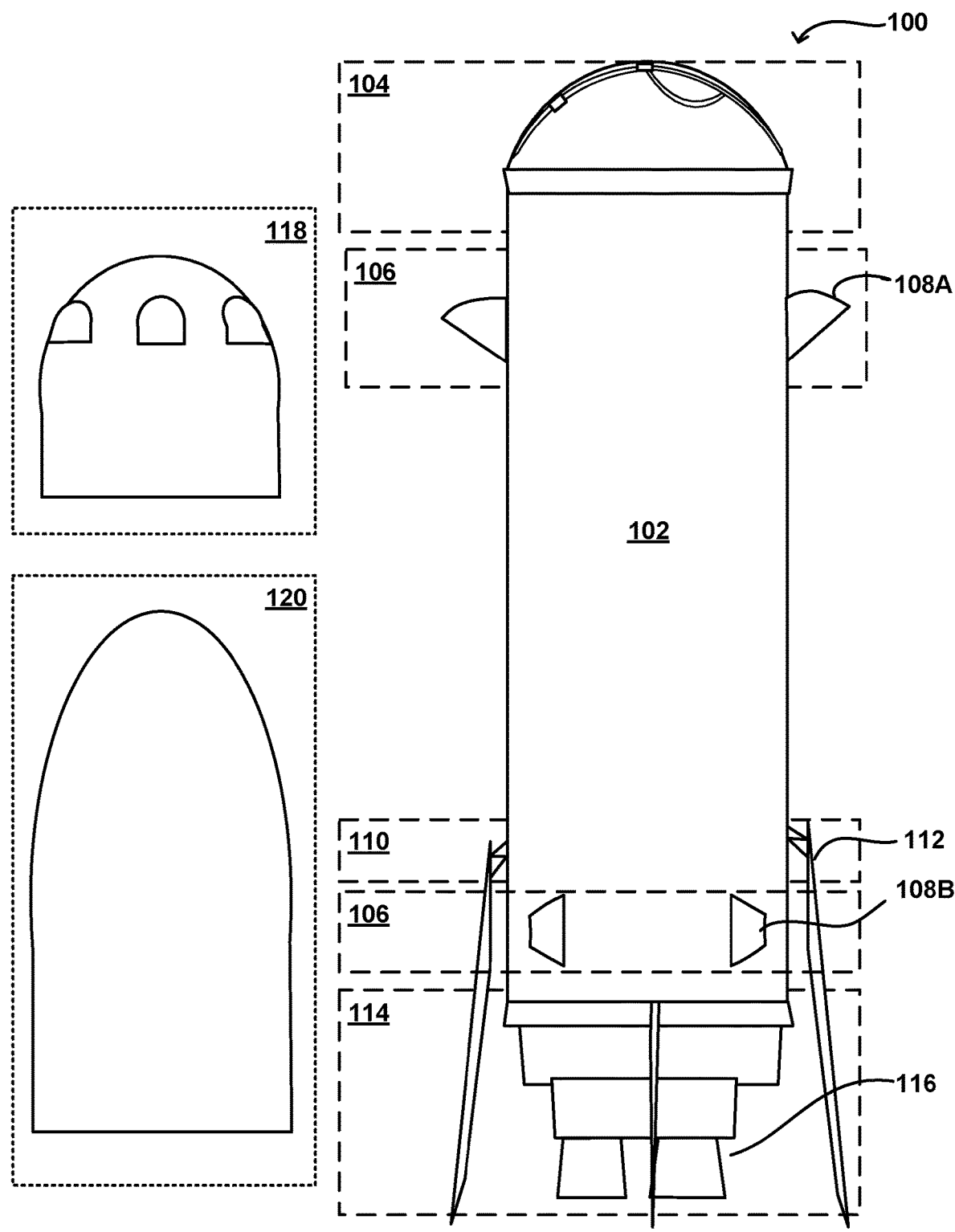
FIG. 1 illustrates a schematic side view of an example of a spacecraft, in accordance with at least one embodiment.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. It should be further appreciated that terms such as approximately or substantially may indicate +/−10 percent.

Systems and methods are directed, at least in part, toward forming a barrier between a wall of a containment structure (e.g., a container, a vessel, a pipe, a nozzle, etc.) and a material (e.g., gas, liquids, solids, combinations thereof) within the containment structure to block direct contact between the material and the wall. At least one embodiment includes a multi-body assembly having a solid wall (e.g., a first wall) that includes one or more ports to receive a fluid (e.g., a gas, a liquid, a solid, or combinations thereof) and a permeable wall (e.g., a second wall, a gas-permeable wall, a fluid-permeable wall, etc.). A barrier fluid, such as a gas in one non-limiting example, may be provided through the one or more ports to a first side of the second wall. Based on a differential pressure, the barrier fluid may be driven through the second wall to a second side. In at least one embodiment, the barrier fluid in the one or more ports may be driven to a void or region between the first wall and the second wall and the barrier fluid may then flow through the permeable wall. After the barrier fluid passes from the first side to the second side, the barrier fluid may create a barrier (e.g., a gap, a sleeve, etc.) between the material within the containment structure and the second wall. Flow may be controlled using one or more fluid movers (e.g., pumps, compressors, differential pressure, etc.) or valves to regulate flow of the barrier fluid into the containment structure. For example, adjustments to flow properties may be used to change or adjust a thickness of the barrier, a force used to introduce the barrier fluid to drive mixing of the material, a temperature of the material, and various other properties. Additionally, outlets of the permeable wall may have different sizing and/or positions based on expected operating conditions. Certain configurations may also use advanced manufacturing techniques, such as additive manufacturing, to form one or more portions of the containment structure as a monolithic piece. Various applications may include reducing a likelihood of corrosion/damage to walls, mixing materials within a containment structure, moderating a material temperature, or various of those applications.

As used herein, fluid may refer to a gas, liquid, solid, plasma, or combinations thereof. Fluid may refer to a flowable fluid such that it has a viscosity that permits flow, which may be driven by differential pressures, gravitational forces, and/or the like. Flow may be laminar, turbulent, or in transition and may also be different between different stages of flow or states of flow. For example, a stagnant fluid may be a fluid that is substantially still or non-moving that is acted upon by a force and begins to move and/or maintains movement. Similarly, a once non-flowable fluid may become flowable due to the addition of energy, such as heat, including melting a solid into a molten state.

As used herein, permeable walls may refer to gas-permeable walls, liquid-permeable walls, or fluid-permeable, or a combination of such permeable walls. Gas-permeable materials may be used to form walls or other barriers in a variable of applications. Additionally, gas-permeable materials may permit gas to diffuse through the materials when the pressure on each side of the material is different, such as moving from a high pressure area to a low pressure area. For example, a gas-permeable material may include pores or openings that permit gas flow from one side of a barrier to another. However, other types of fluids, such as liquids or solids, may be blocked by the material. Various types of materials may be gas-permeable, including synthetic materials, such as polymers, silica, metals, and the like. Other types of materials may also be made fluid-permeable due to one or more ports or openings that are formed from one side of the material to another.

FIG. 1 illustrates aspects of a space rocket 100 having at least one component including a fluid-permeable material to form a barrier between a stored or contained fluid and a wall or structure supporting the stored or contained fluid, according to at least one embodiment. The space rocket 100 is shown as one non-limiting example and features described herein may also be incorporated into various other applications, such as storage tanks, vessels, piping systems, aircrafts, water vehicles, and/or the like. In this example, the space rocket 100 includes a propulsion module 102, which may include features such as fuel-related control 104; flight control 106 via provided fins 108A, strakes 108B, or other wing-like provisions for lift and cross-range control during flight; landing control 110 via provided hydraulic-actuated legs 112 to support and secure a stage during landing; and engine control 114 via one or more thrusters 116.

Further illustrated in FIG. 1 are an example re-entry capsule 118 and a fairing 120. These components may, in various embodiments, be provided as part of the space rocket 100 by attachment to the propulsion module 102. The re-entry capsule 118 may include passengers for space tourism or space related work, whereas the fairing 120 may include one or more satellites for orbit placement. Therefore, the illustrated propulsion module 102, along with the re-entry capsule 118 or the fairing 120, may include features that may be subject to different operational conditions, and as a result, may have different configurations with respect to cooling, insulation, and the like. The re-entry capsule 118 or the fairing 120 may be part of a flight of the propulsion module 102. The re-entry capsule 118 or the fairing 120 may be atop the propulsion module 102. Therefore, the propulsion module 102 may be a rocket, such as a booster rocket. There may be a further component that may be ejected or dispensed from one or more of the propulsion module 102, the re-entry capsule 118, or the fairing 120.

A flight of the propulsion module 102, with the re-entry capsule 118, may be a same or a similar flight of the New Shepard® suborbital vehicle by Blue Origin®. A flight of the propulsion module 102, with the fairing 120, may be a same or a similar flight of the New Glenn® suborbital vehicle by Blue Origin®. The New Shepard® suborbital vehicle may be the re-entry capsule 118 whereas the fairing 120 may not be capable of re-entry. Further, while able to perform re-entry from just beyond a Karman line, the re-entry capsule 118 herein may be one that, without limitations, docks with a space station or performs space-related investigations, prior to re-entry and landing back on Earth's surface. The Karman line may be a reference point for an internationally recognized boundary of space that may be 100 kilometers or 330,000 feet above Earth's mean sea level.

In preparation for flight operations, preflight activities may be performed, which may include loading of satellites and other components, or providing fluid flow to one or more components, such as to fill various tanks that may be used to provide a fuel source for various stages of flight operations. The preflight activities may also include preparing one or more parachute systems to be loaded into respective containers of the respective components.

The flight may begin with liftoff of the propulsion module 102 at a first time. Minutes later, such as, after a first time span and at a second time, the re-entry capsule 118 or the fairing 120 separates from the propulsion module 102. The re-entry capsule 118 may travel along a trajectory that allows for delayed re-entry or along any other trajectory for purposes of docking with a space station or performing other space-related investigations prior to re-entry. Meanwhile, the propulsion module 102 may fall back to Earth's surface, along a different trajectory, in a booster re-entry phase, eventually landing at a third time.

Further, a second time span pertains to when the re-entry capsule 118 or the fairing 120 eventually reach apogee (e.g., their maximum distance from Earth), during free-flight (e.g., sans rocket propulsion) in micro-gravity (hereinafter referred to by the approximation "zero-gravity"). Although, for other trajectories, there may be more time required to reach a suitable orbit or path to continue docking with a space station or for performing other space-related investigations prior to re-entry. For example, a satellite may be enabled, using the illustrated other trajectory, to reach a suitable orbit. The re-entry capsule 118 may be in zero-gravity for several minutes before falling back toward Earth and out of zero-gravity. However, some other components need not reach the zero-gravity threshold. The time period of several minutes in zero-gravity is referred to herein as free-flight. After this period, the re-entry capsule 118 may begin to fall toward Earth and begin to encounter atmospheric drag. The fairing 120 may deploy its satellites or other components to orbit and may not be capable of re-entry. The flight may end when the re-entry capsule 118 or other component, travelling along its intended trajectory, lands on Earth's surface.

The re-entry capsule 118 may be used to carry equipment to and from space, samples to and from space, or crew or passengers to and from space. The re-entry capsule 118 may be autonomously or remotely controlled so that only passengers are on board without the passengers requiring to control the re-entry capsule 118. Thus, the flight and the re-entry capsule 118 may be configured for any suitable space mission, including for docking with a space station, for space investigation, sample recovery, deep space travel and return, space tourism, and rendering photography.

Embodiments may incorporate one or more fluid barriers (e.g., fluid shields, fluid sleeves, etc.) that may be used with various components that contain fluids for space craft operations. As one example, the one or more thrusters 116 may exhaust gases resulting from combustion of a fuel (e.g., a liquid fuel, a solid fuel, a solid fuel-oxidizer mixture, etc.) and an oxidizer (e.g., a liquid oxidizer). Additionally, other types of rocket propulsion may also be used, including but not limited to, chemically powered (e.g., solid-propellant, hybrid-propellant, monopropellant, bipropellant, and combinations thereof), electrically powered, and nuclear powered, among other options. The exhaust gases may include corrosive or material-damaging compounds, as well as a significant amount of heat energy. As a result, materials associated with the one or more thrusters 116 may be selected to accommodate such operating conditions. During operation, different components may be exposed to corrosive and/or abrasive materials, such as cooling fluids, propellants, and/or the like. Systems and methods enable a fluid barrier (e.g., a fluid shield, a gas barrier, a gas shield, a liquid barrier, a liquid shield, etc.) that may provide a barrier between a contained fluid and a containing surface, such as a pipe or vessel wall. As a result, non-contact transfer may be enabled where the contained fluid or a flowing fluid does not directly contact the containing surface, which may enable containing surfaces to be formed from different materials and/or increase a working life of the containing surfaces. Additionally, the fluid barrier may be configured to provide temperature control for the contained fluid and/or to induce mixing or other movement of the contained fluid.

Figure 2:
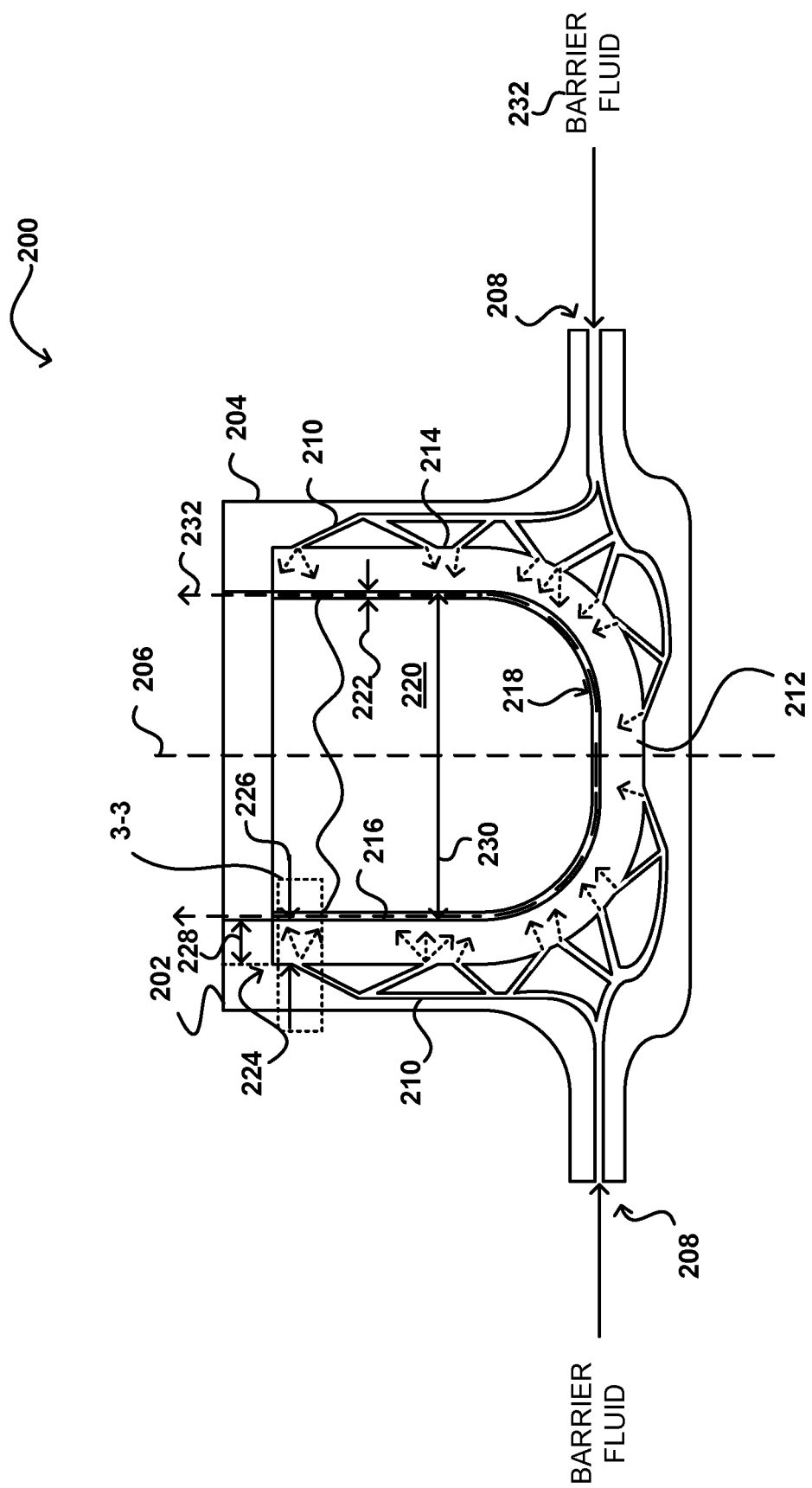
FIG. 2 illustrates a cross-sectional view of an example of a containment system, in accordance with at least one embodiment.

FIG. 2 illustrates an example cross-sectional view of containment system 200 that may be used with various embodiments. The illustrated containment system 200 includes a containment structure 202 (e.g., a container) having an outer wall 204. The outer wall 204 may be solid, such as being formed from a metallic material, and in various embodiments may be cast, formed, additively manufactured, and/or the like. The containment structure 202 may be an annular container that is revolved about a longitudinal axis 206 (e.g., an outer diameter of the outer wall 204 may be an outer circumference of the containment structure 202). In other words, the outer wall 204 may be a continuous or semi-continuous structure that extends around an inner void where one or more materials may be positioned. For example, the containment structure 202 may be substantially "pill-shaped" and may include elliptical or semi-elliptical heads, among other options. As a further example, the containment structure 202 may also be a spherical container or may be a tubular container with planar ends. Embodiments may also be used with containers that do not include spherical, elliptical, semi-elliptical, or planar heads and the illustrated configuration is provided by way of non-limiting example. Systems and methods may also be used with containment structures 202 that are not sealed or fully closed off, such as pipes (e.g., tubulars), nozzles, and the like. Additionally, containment structures 202 may also refer to components that permit flow through one or more regions, such as valves.

Inlet flow passages 208 are illustrated extending through the outer wall 204 to connect to passages 210. The illustrated passages 210 include a variety of different branches that are directed toward different locations of one or more fluid-permeable walls 212. The fluid-permeable walls 212 may also be referred to as gas-permeable walls or liquid-permeable walls, but embodiments are not limited to only gas or liquid and such a reference is by way of non-limiting example. Accordingly, while one or more barrier fluids may be described as a gas, the barrier fluids herein may also be liquids, solids, plasmas, or combinations thereof, including combinations with gases. The fluid-permeable walls 212 may include one or more pores or ports that permit one or more selected fluids to flow from a first side 214 (e.g., an outer sider) to a second side 216 (e.g., an inner side) of the fluid-permeable walls 212. The first side 214 in this example may be described as being radially farther away from the longitudinal axis 206 compared to the second side 214. That is, a distance between the first side 214 and the longitudinal axis 206 is greater than a distance between the second side 216 and the longitudinal axis 206. The first side 214 may also be described as being closer to the outer wall 204 compared to the second side. That is, a distance between the first side 214 and the outer wall is less than a distance between the second side 216 and the outer wall 204.

The pores of the fluid-permeable walls 212 may be particularly selected to permit a certain type of barrier fluid (e.g., a selected gas, a selected liquid, etc.) but to block other fluids. As one non-limiting example, the barrier fluid may be nitrogen that is supplied, under pressure, into the inlet flow passages 208 for transmission to the fluid-permeable walls 212 through the passages 210. Material(s) used to form the fluid-permeable walls 212 may be selected to accommodate nitrogen, and as a result, the nitrogen may pass through the fluid-permeable walls 212 from the first side 214 to the second side 216. The materials(s) may be further selected to block ingress from the interior of the containment structure 202, as described herein.

In this example, a barrier 218 (e.g., a gas sleeve, a gas barrier, a fluid barrier, a fluid sleeve, a separation, etc.) is formed along the second side 216 by the barrier fluid after it passes through the fluid-permeable walls 212. As discussed herein, because the barrier fluid is under pressure, the barrier fluid may flow through the fluid-permeable walls 212 to the second side 216. However, because of the pressure of a contained fluid 220 within the containment structure 202, further flow of the fluid toward the longitudinal axis 206 may be blocked or restricted by the contained fluid 220. The pressure used to drive the fluid may be particularly selected based, at least in part, on a desired barrier thickness 222. Higher pressure, and higher flow rates, may lead to thicker barriers 218 while lower pressures and lower flow rates may lead to thinner barriers 218.

As noted herein, the contained fluid 220 may be a gas, liquid, solid, plasma, or combinations thereof. Additionally, the contained fluid 220 may be a molten fluid (e.g., a solid that has been melted to liquid form). In at least one embodiment, the fluid may have properties that could damage the fluid-permeable walls 212 and/or the outer walls 204, such as being corrosive or including abrasive materials. Systems and methods provide the barrier 218 to reduce and/or substantially eliminate contact between the contained fluid 220 and the fluid-permeable wall 212 and/or the walls 204. As a result, less-exotic or less costly materials may be used and/or a likelihood of damage, resulting in more frequent repairs or replacements, may also be reduced. Moreover, as described herein, the barrier 218 may also be used to regulate or act on the contained fluid 220, which may include inducing mixing or temperature regulation. As a result, in at least one embodiment, the barrier 218 may be intended to combine with the contained fluid 220.

In at least one embodiment, the fluid-permeable walls 212 may be positioned at different sections along a length of the containment structure 202 and/or may extend along an entirety or substantially an entirety of the containment structure 202. For example, segments of the containment structure 202 may include the fluid-permeable walls 212 within an recessed portion 224 of the outer wall 204. Certain configurations may be presented such that a fluid-permeable wall thickness 226 may be substantially equal to a recess depth 228, and as a result, a constant or substantially constant inner diameter 230 may be maintained for the containment structure 202. However, in one or more alternative embodiments, the fluid-permeable wall thickness 226 may be less than or greater than the recess depth 228, which may lead to a variable inner diameter 230 along a length of the containment structure 202.

As shown in FIG. 2, the fluid introduced as the barrier may be exhausted or otherwise mixed within the container fluid 220. That is, the fluid used as the barrier may be added to the container fluid 220. In such embodiments, it may be desirable to use a barrier fluid 232 that is inert, such as, such as nitrogen. Embodiments may also use a reactant or catalyst as the barrier fluid 232. For example, the barrier fluid 232 may include one or more chemicals or compounds that may react with the contained fluid 220 under one or more conditions, such as at a certain pressure or in the presence of an ignition source. Accordingly, the barrier fluid 232 may be used to mix or otherwise combine various fluids. In various embodiments, the barrier fluid 232 may be provided from a storage location under pressure using one or more fluid movers.

Systems and methods may also use the barrier fluid 232 to cool or regulate the contained fluid 220. The barrier fluid 232 may be introduced at a first temperature, which may be greater than or less than a temperature of the contained fluid 220. Flow rates for the barrier fluid 232 may be modified or controlled to achieve desired cooling or heating effects, which may be tracked by one or more sensors that provide information to one or more controllers that may be used to adjust flow rates of the barrier fluid.

Various embodiments may also provide one or more ports associated with the fluid-permeable walls 214 to induce mixing or movement of the container fluid 220. For example, the ports may be aligned at different angles with respect to the longitudinal axis 206 and/or additional axes or flow directions. For example, flow ports may be aligned at different azimuthal angles to stir the contained fluid 220. In this manner, the introduction of the barrier fluid may both provide the barrier 218 between the contained fluid 220 and the fluid-permeable walls 214 while also adding energy to the contained fluid 220 for mixing, movement, stirring, and/or the like.

In at least one embodiment, a gap or void may be formed between the fluid-permeable walls and outlets for the respective passages 210. The gap or void may be filled with the barrier fluid 232 and then, as pressure builds up, may be driven through the fluid-permeable walls 212. Configurations that include the gap or void may enable thinner fluid-permeable walls 212.

In operation, the contained fluid 220 may be added to the containment structure 202 before, after, or simultaneously (e.g., substantially simultaneously) with the barrier fluid 232. For example, the containment structure 202 may be filled and then the barrier fluid 232 may be added in order to form the barrier 218. In at least one embodiment, there may be one or more vents or relief valves to regulate pressure within the containment structure 202. For example, as barrier fluid 232 is introduced, the pressure and/or volume within the containment structure 202 may increase. By monitoring the pressure within the containment structure 202, it may be determined whether additional barrier fluid 232 is needed to achieve a desired barrier and/or whether a volume of fluid may be reduced or if flow can be stopped and plugged in order to maintain a current level. For example, the contained fluid 220 may be added to the containment structure 202 and a pressure or volumetric reading may be obtained. Thereafter, the barrier fluid 232 may be added to reach a desired pressure reading or desired volumetric reading. The inlet passages 208 may then be capped or plugged.

Figure 3:
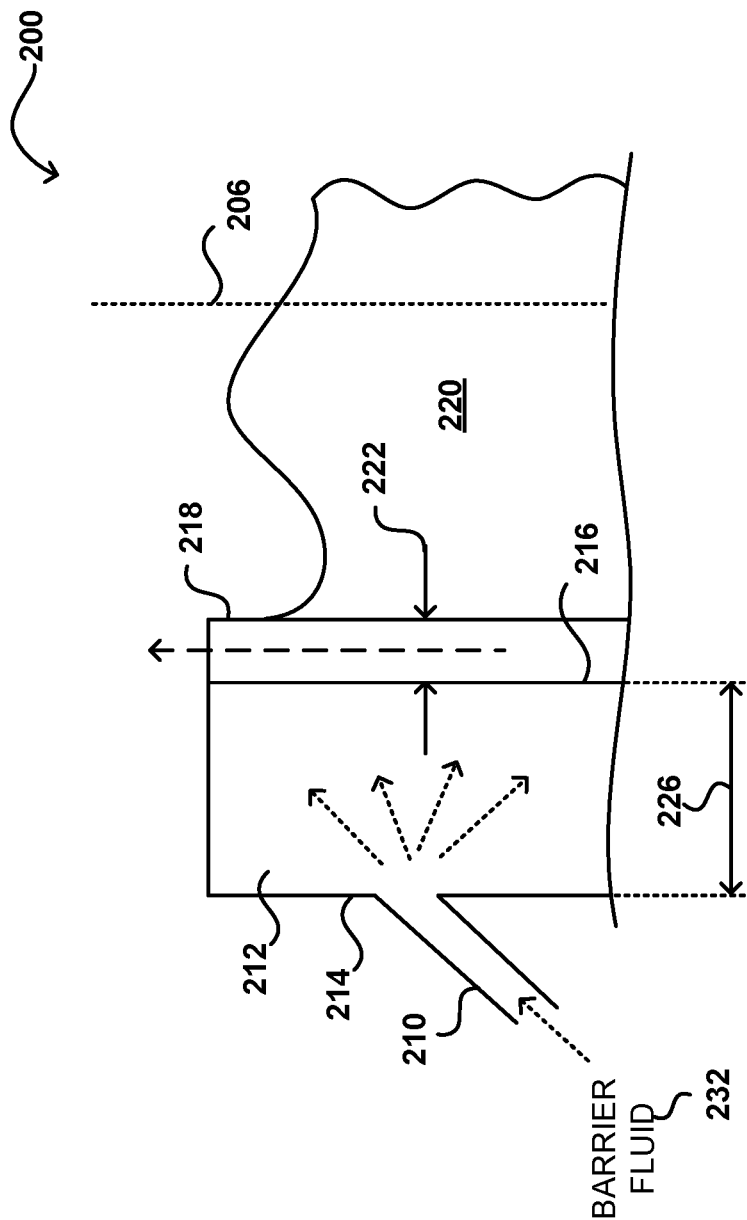
FIG. 3 illustrates a detailed cross-sectional view taken along 3-3 of an example of a barrier along a fluid-permeable material, in accordance with at least one embodiment.

FIG. 3 illustrates a detailed cross-sectional view of the containment system 200 taken along 3-3. In this example, the fluid-permeable walls 212 are illustrated as receiving the barrier fluid 232 at the first side 214 via the passages 210. The barrier fluid 232 may be pressurized and driven through the fluid-permeable walls 212, for example due to a pressure differential across the fluid-permeable walls 212. As noted herein, wall material may be particularly selected based on the barrier fluid 232 and its properties so that pores or a density of the wall material permits flow through the wall thickness 226 from the first side 214 to the second side 216.

As the barrier fluid 232 moves to the second side 216, the barrier 218 is formed between the fluid-permeable walls 212 and the contained material 220. Accordingly, contact between the contained material 220 and the fluid-permeable walls 212 may be reduced or eliminated. Additionally, the barrier 218 may continue to form along portions of the inner diameter 230 that do not include the fluid-permeable walls 212, which may further support the remaining material used to form the containment structure 202. For example, as illustrated by the arrow, the barrier fluid 232 forming the barrier 238 may continue to move along the longitudinal axis 206 to cover or substantially cover the inner diameter of the containment structure 202. The barrier thickness 222 may be adjusted based on a variety of factors, such as flow rate, pressure, and the like.

Figure 4A:
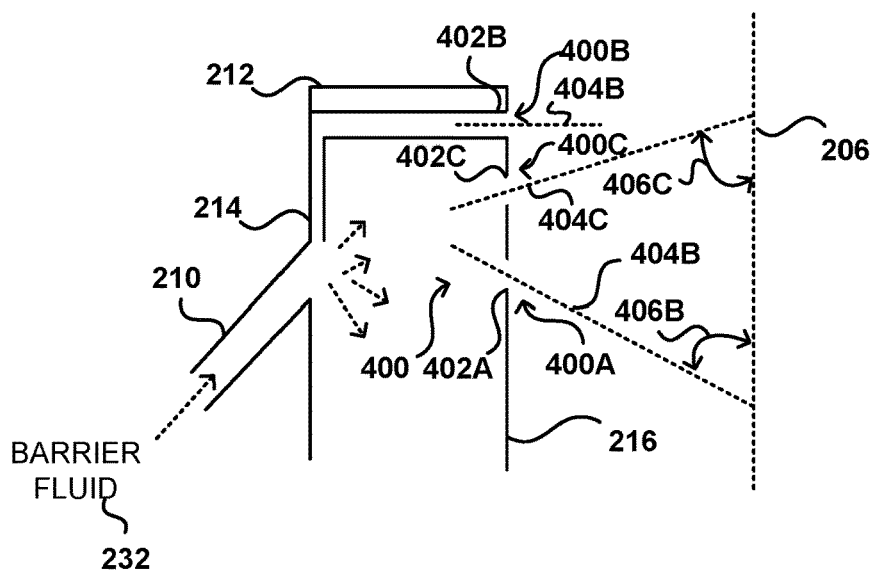
FIG. 4A illustrates a cross-sectional view of an example of flow ports of a containment system for forming a barrier along an inner container wall, in accordance with at least one embodiment.

FIG. 4A illustrates an example cross-sectional view of an embodiment in which the fluid-permeable walls 212 include one or more ports 400 that may be used to direct flow of the barrier fluid 232. The ports 400 may be provided as additional features of the fluid-permeable walls 212, such as the port 400B, or may be the fluid passageways that permit movement of the barrier fluid 232 from the first side 214 to the second side 216, such as the port 400A. In at least one embodiment, combinations of the different ports 400A, 400B may be included within different regions of the containment structure 202.

Each port 400 includes an opening 402 that is arranged along a flow axis 404. The flow axis 404 may be arranged at an angle 406 with respect to the longitudinal axis 206. As illustrated, one or more ports 400 may have different angles 406 for respective flow axes 404. The port 400A includes the flow axis 404A at the opening 402A arranged at the angle 406A, which is a downwardly facing angle. The port 400B includes the flow axis 404B at the opening 402B arranged to be perpendicular to the longitudinal axis 206. The port 400C includes the flow axis 404C at the opening 402C arranged at the angle 406C, which is upwardly facing. As described herein, "upwardly" and "downwardly" are in reference to the example of FIG. 4A and are not intended to be limiting, as various angles may be in various positions and have varying degrees with respect to the longitudinal axis 206.

In operation, the direction (e.g., angles of the flow axes) may be particularly selected based on desired flow characteristics. For example, upwardly facing flow angles my drive fluid in an upward direction, which may induce mixing or stirring. Similarly, downwardly facing flow angles may cause rotation of the fluid to move fluid from a bottom region to a top, which may help circulate solids within the fluid. Perpendicular angles may be used to generate and maintain the barriers 218. Accordingly, systems and methods may select a number of ports 400, respective port flow axes 404, and port positions based on operating conditions and the like.

Figure 4B:
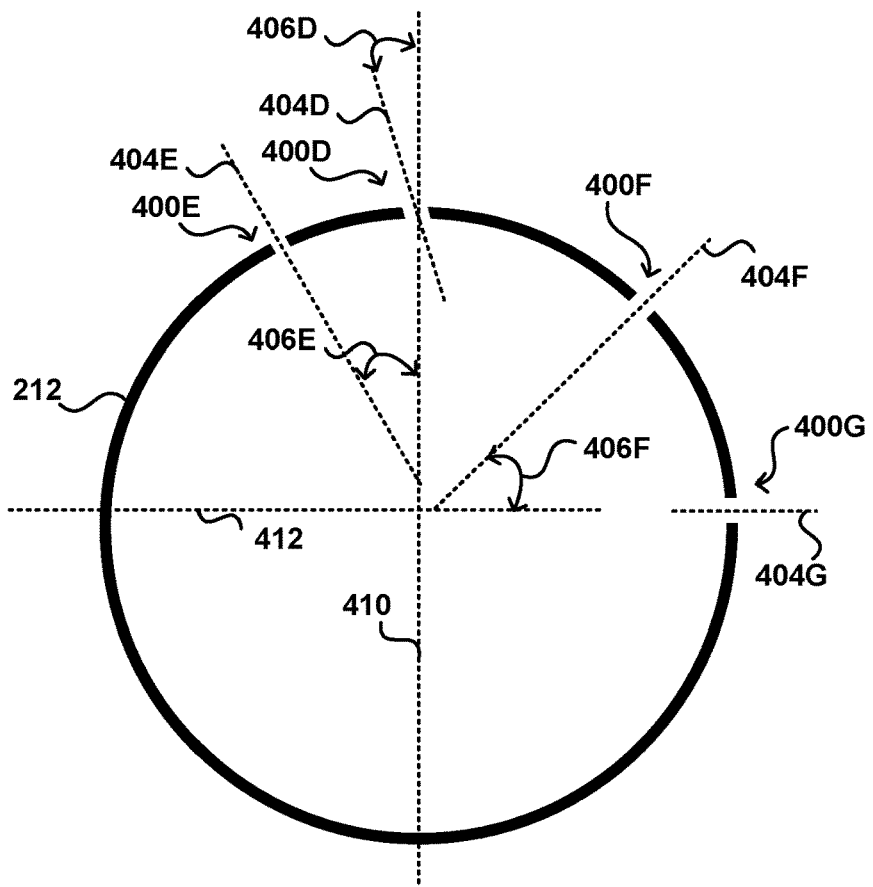
FIG. 4B illustrates a top cross-sectional view of an example of flow ports of a containment system for forming a barrier along an inner container wall, in accordance with at least one embodiment.

FIG. 4B is a top cross-sectional view of an embodiment of the containment structure 202 illustrating the ports 400 arranged at various azimuthal positions. In this example, one or more of the ports 400 are positioned at different angles 406 with respect to a first cross axis 410 and/or a second cross axis 412. Each of the first cross axis 410 and the second cross axis 412 may be aligned along diameters of the containment structure 202, which in this example is an annular containment structure. It should be appreciated that the position of the ports 400, the respective angles, distances between the ports 400, and the like are provided by way of non-limiting example. Accordingly, different embodiments may include a different number of ports in different quadrants, a different port angles, and/or the like.

In the illustrated example, the port 400D is positioned along the first cross axis 410, which will be arranged substantially perpendicular to the longitudinal axis 206 (not pictured). The port 400D includes the flow axis 404D positioned at the angle 406D with respect to the first cross axis 410. In this example, the arrangement of the flow axis 404D induces rotation/stirring/mixing of the contained fluid 220 because an inlet force provided by the barrier fluid 232 (e.g., due to the pressure differential driving the barrier fluid 232 across the fluid-permeable walls 212) is transferred to the contained fluid 220 at the angle 406D, which will drive movement and rotation of the contained fluid 220. Different examples shown in FIG. 4B may be provided in the alternative or in combination with others. For example, the ports 400E, 400F includes their own respective flow axes 404E, 404F arranged at their own respective angles 406E, 406F. As shown, the various angles 404 may be different, with certain angles providing a greater mixing force than others. Additionally, the example port 404F is arranged at an opposite direction compared to the port 400E. That is, the flow axis 404F may be described as positioned at the angle 406F with respect to the second cross axis 412. As another example, the port 400G is positioned along the second cross axis 412 and the flow axis 404G is perpendicular to the first cross axis 410. Systems and methods may combine or modify different angular positions of the ports 400 in order to direct or otherwise facilitate particular flow behavior within the containment structure 202. Furthermore, in at least one embodiment, one or more valves or regulators may be included to open, close, or throttle barrier fluid flow into the containment structure 202 through the ports 400.

Figure 4C:
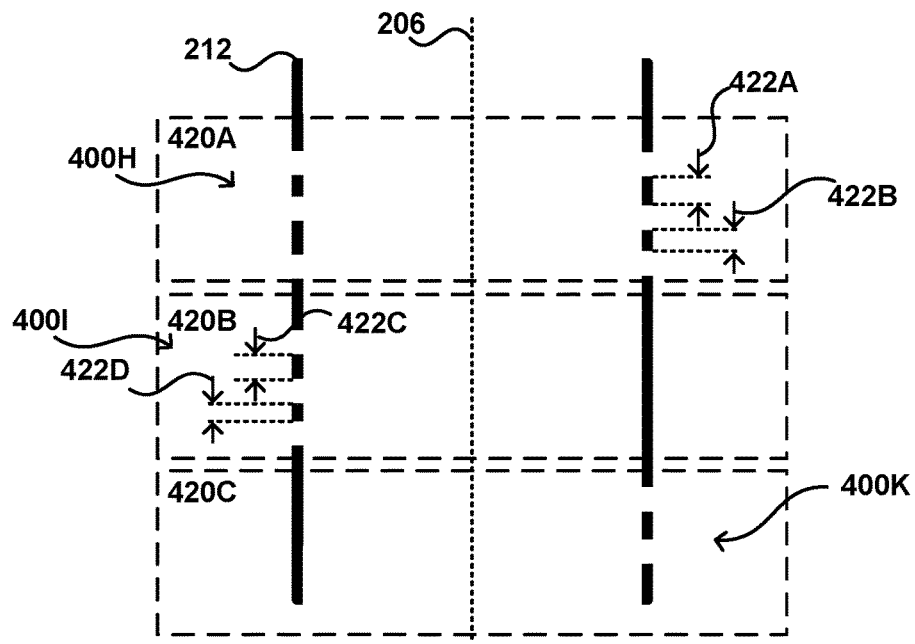
FIG. 4C illustrates a cross-sectional view of an example of flow ports of a containment system for forming a barrier along an inner container wall, in accordance with at least one embodiment.

FIG. 4C illustrates a cross-sectional view of an embodiment of the fluid-permeable walls 212 taken along the first cross axis 410. In this example, different regions 420 of the fluid-permeable walls 212 include different example port configurations. These port configurations may also be referred to as a "density" where more ports 400 within a region may be referred to as having a higher or greater density than another region with fewer ports 400. In the illustrated configuration, a first region 420A includes a set of three ports 400H that are equally spaced apart by a spacing distance 422. In other words, the spacing distance 422A is equal to the spacing distance 422B. Furthermore, the arrangement of the ports 400H is symmetrical about the longitudinal axis 206. However, such a configuration is by way of example only, as the different ports, as noted herein, may be asymmetrical, include different flow axis configurations, and the like.

In contrast to the first region 420A, a second region 420B includes a set of ports 400I that have different spacing distances 422C, 422D between adjacent ports 400. Different spacing distances 422 may lead to regions with "tighter" port configurations, which may enable greater port density by having a larger number of ports over a region. Furthermore, the arrangement of ports 400I is asymmetrical in the second region 420B. As shown in this example, only one side includes ports 400 while the other does not. Such a configuration may be used to induce mixing within a particular region. Further illustrated is a third region 420C that includes a pair of ports 400J. Accordingly, systems and methods may include a variety of different port arrangements, including different numbers of ports in different regions, different spacing between ports, and different configurations at various locations of the fluid-permeable walls 212.

Figure 4D:
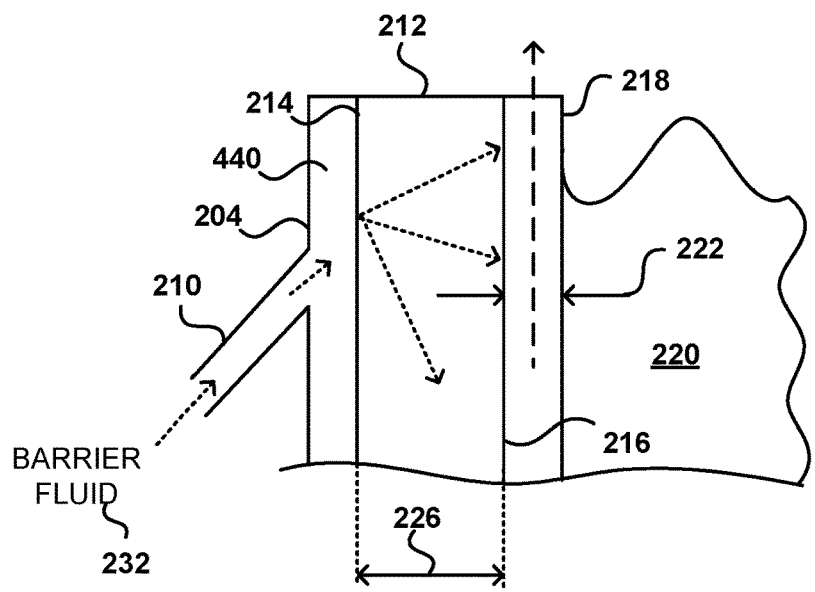
FIG. 4D illustrates a cross-sectional view of an example containment system including a fluid collection void, in accordance with at least one embodiment.

FIG. 4D illustrates a schematic detailed view of an embodiment of the containment system 200 that includes a void space 440 between the outer wall 204 and the fluid-permeable walls 212. In this example, the barrier fluid 232 is directed toward the voice space 440, which may fill and then direct the barrier fluid 232 toward and through the fluid-permeable walls 212 via a differential pressure. Embodiments that include the void space 440 may include different segments or regions with fixed void volumes that may become filled with the barrier fluid 232 prior to achieving a sufficient differential pressure to generate the barrier 218. Accordingly, in at least one embodiment, the void space 440 may be filled to a threshold volume and then maintained at a pressure where the barrier fluid 232 does not pass through the fluid-permeable walls 212, which may enable the use of the barrier 218 to be activated and deactivated based on different operating conditions.

Figure 5:
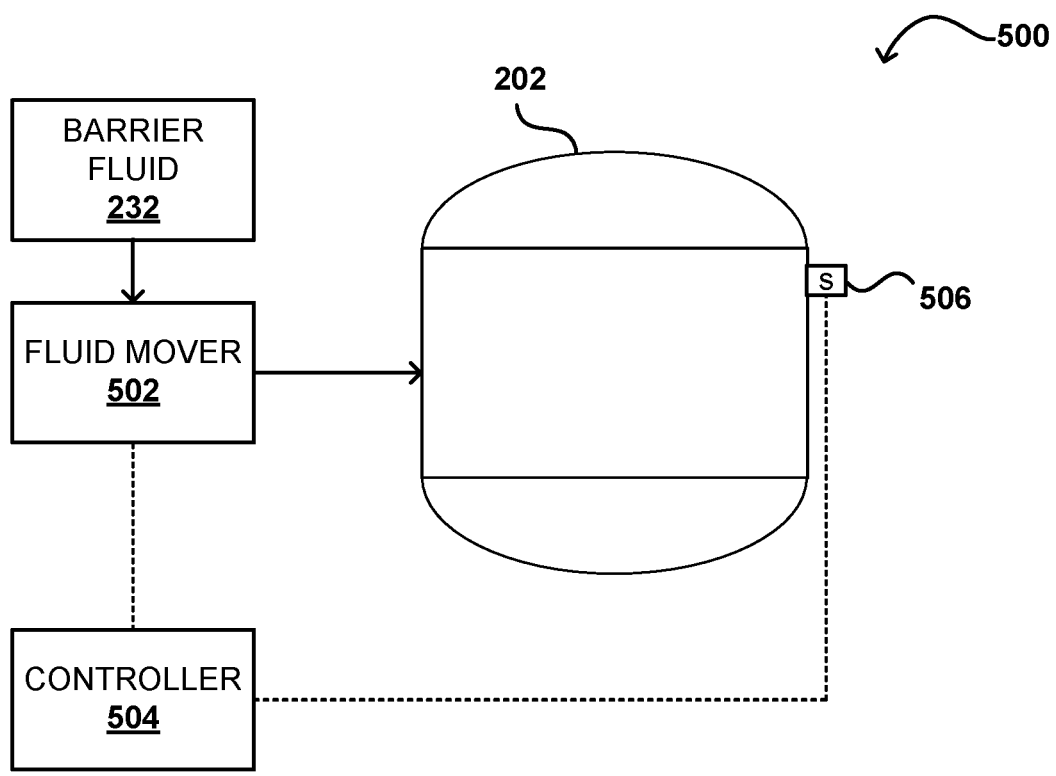
FIG. 5 illustrates an schematic example control system for a containment system, in accordance with at least one embodiment.

FIG. 5 illustrates an example control configuration 500 that may be used with the various embodiments. In this example, the containment structure 202 receives the barrier fluid 232 from a fluid mover 502, which may include a compressor, a pump, a set of valves, or combinations thereof. The fluid mover 502 may also be representative of a position or location of the barrier fluid 232, such as a container that holds the barrier fluid, which uses a differential force or pressure, such as gravity to drive the barrier fluid 232 into the containment structure 202. In at least one embodiment, the fluid mover 502 is activated by a controller 504 based on signals received from one or more sensors 506. For example, the one or more sensors 506 may be used to determine a pressure of contained fluid within the containment structure 202 and that information may be used to determine an inlet pressure for the barrier fluid 232. In another example, the one or more sensors 506 may monitor a volume of the containment structure 202 to determine a quantity of barrier fluid 232 to add into the containment structure 202. Various embodiments may also further include valve configurations, relief valves, regulators, and additional sensors.

Figure 6:
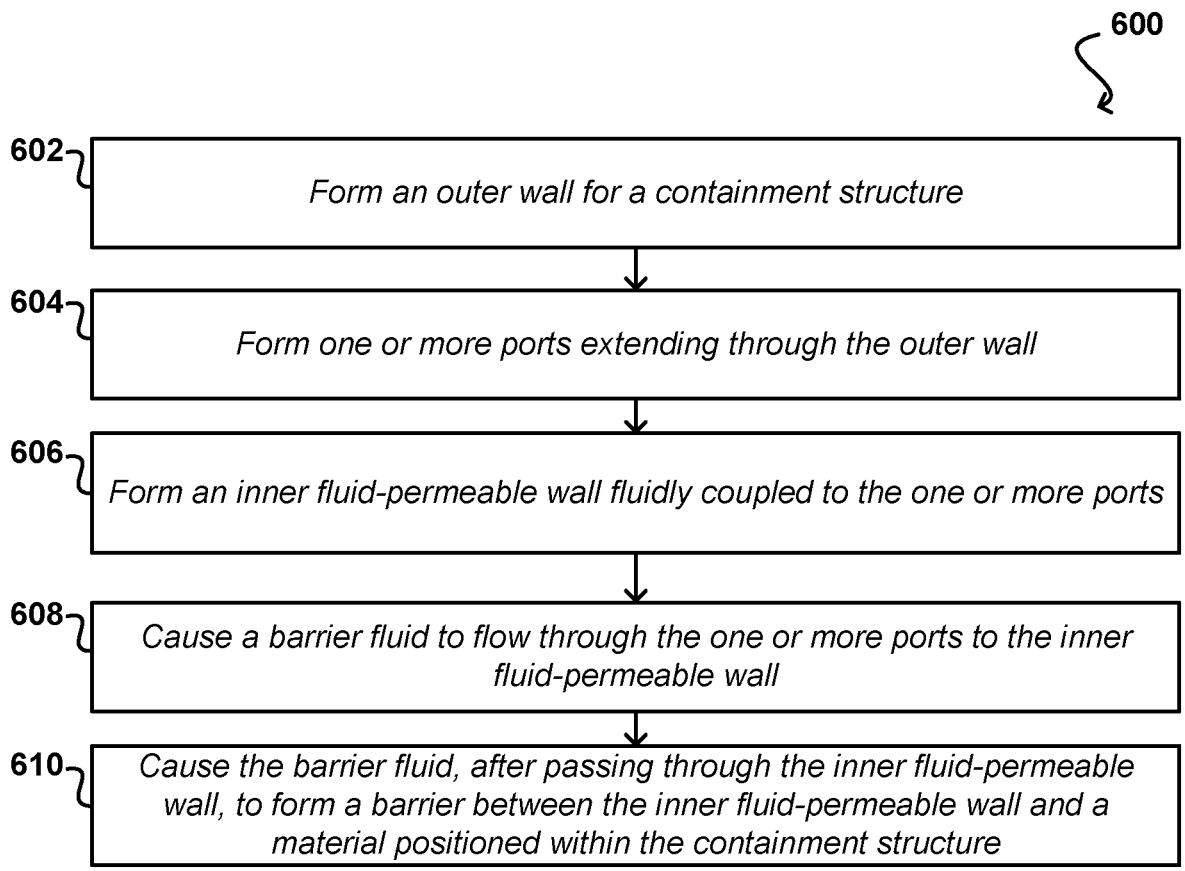
FIG. 6 illustrates an example process for forming a barrier along an inner container wall, in accordance with at least one embodiment.

FIG. 6 illustrates an example process 600 to form a barrier within a containment structure, in accordance with various embodiments. It should be understood that for this and other processes presented herein that there may be additional, fewer, or alternative operations performed in similar or alternative orders, or at least partially in parallel, within the scope of the various embodiments unless otherwise specifically stated. In this example, an outer wall for a containment structure is formed 602. In at least one embodiment, the outer wall is formed using an additive manufacturing process and may include metals, polymers, or combinations thereof. The containment structure may refer to an item that supports or otherwise maintains a fluid within a barrier and may refer to configurations such as spherical containers, elliptical-head containers, pipes (e.g., tubulars), nozzles, valve bodies, and combinations thereof. One or more ports may be formed that extend through the outer wall 604. The one or more ports may be coupled to an inlet passage to permit a barrier fluid to flow through passages formed through the outer wall.

Embodiment also including forming an inner fluid-permeable wall that is coupled to the one or more ports 606. The inner fluid-permeable wall may be substantially coaxial with the outer wall. In at least one embodiment, the inner fluid-permeable wall is formed within a recess of the outer wall. A barrier fluid may be caused to flow through the one or more ports to the inner fluid-permeable wall 608. As discussed herein, the barrier fluid may include liquids, solids, gases, plasmas, or combinations thereof. In at least one embodiment, material properties for the inner fluid-permeable wall are selected, at least in part, based on the barrier fluid. For example, pore sizes may be determined or selected for different types of barrier fluid. As another example, ports may be formed through the wall based on the selected barrier fluid. The barrier fluid, after passing through the inner fluid-permeable wall, may then from a barrier between the inner fluid-permeable wall and a material positioned within the containment structure 610. The barrier position and thickness may be based on properties of the barrier fluid and/or injection parameters, such as pressure, flow rate, and the like. Accordingly, embodiments may be used to form a barrier between an enclosed material and an outer wall to reduce a likelihood of contact between the enclosed material and the outer wall.

Figure 7:
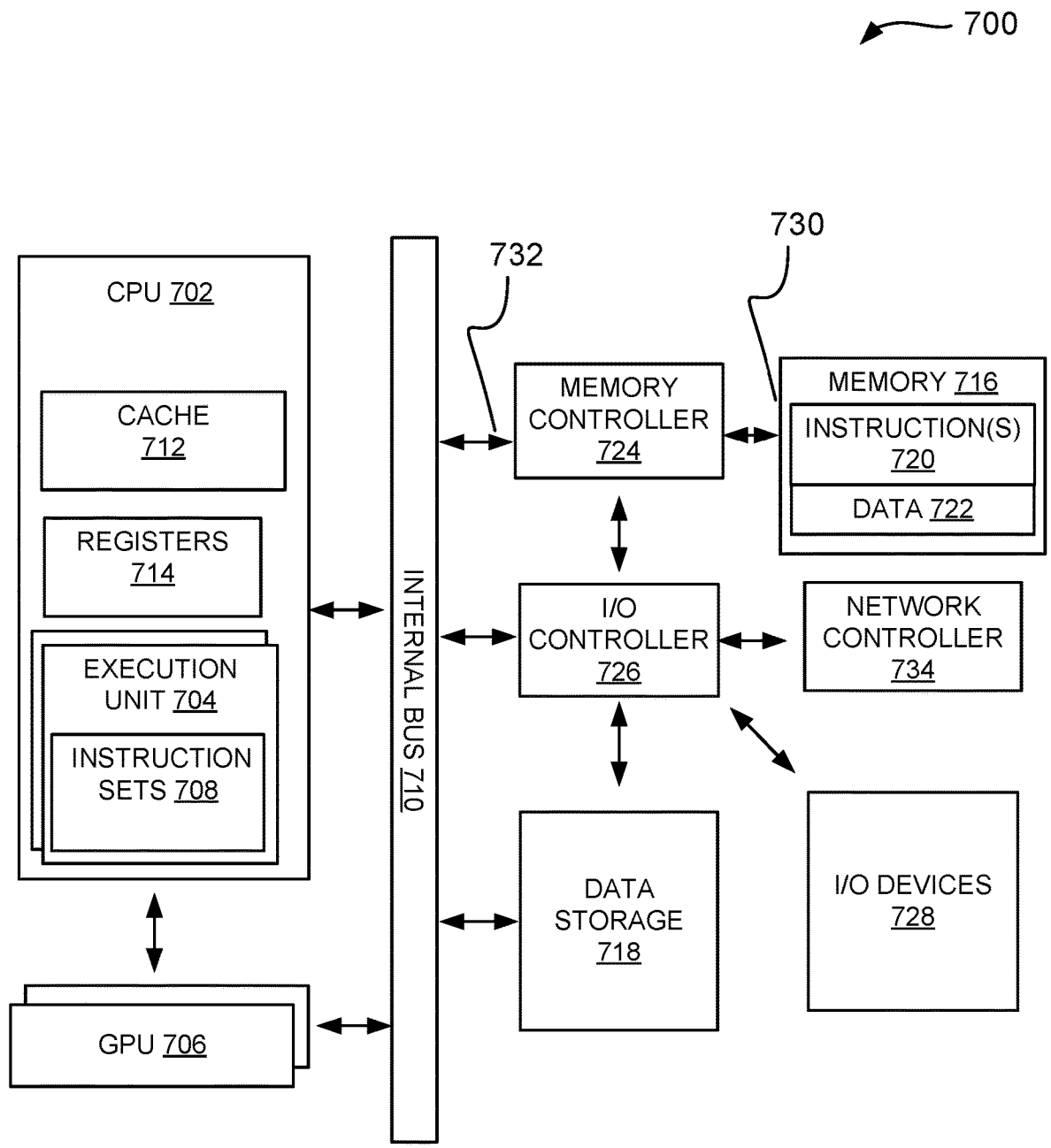
FIG. 7 illustrates computing features of an environment for a control system for a containment system, according to at least one embodiment.

FIG. 7 illustrates a computing features 700 of an environment for a controller used in a control system, according to at least one embodiment. For example, the computing features 700 may be used to control one or more pieces of equipment for a containment system and/or to receive information, such as streaming information or periodic information, from one or more connected sensors.

The central processing unit (CPU) 702 may include one or more execution units 704 that may include multiple circuits. The CPU 702 may be a special-purpose processor that is associated with one or more GPUs 706. The computing features 700 may be performed by a system-on-a-chip (SoC), or some combination thereof, formed within a CPU 702. The CPU 702 may include execution units 704, as illustrated. The CPU 702 is able to execute instructions from one or more instruction sets 708. The CPU 702 includes support for logic in its execution units 704. The logic may be used to perform algorithms for processing. Further, the CPU 702 and the GPUs 706 include support for performing binary code.

In an example, an execution unit 704 may include logic to perform integer and floating point (FP) operations. The execution unit 704 may be within the one or more of the CPU 702 or the GPUs 706. However, there may be multiple execution units 704 that may be coordinated to perform distributed computing features of the testing described herein. Further, one or more of the CPU 702 or the GPUs 706 may include a microprocessor code from a read only memory (ROM) for performing macro-instructions. An execution unit 704 of one or more of the CPU 702 or the GPUs 706 may include logic to handle one or more different types of instruction sets 708.

The one or more different types of instruction sets 708 may include an instruction set of a special-purpose processor, along with associated circuits to execute instructions therefrom. Further, operations caused by the instructions may be used by the testing related modules described herein. There may be packed data in the one or more of the CPU 702 or the GPUs 706 which may be used with the instructions to provide the operations.

The execution unit 704 may be provided via microcontrollers, embedded processors, or other components of the CPUs, GPUs, or DPUs. However, the execution unit 704 may be other types of logic circuits than provided in such CPUs, GPUs, or data processing units (DPUs). The computing features 700 may include a memory 716 that is external to the one or more of the CPU 702 or GPUs 706 but that is coupled to the one or more of the CPU 702 or GPUs 706 via a high speed internal bus 710. This memory 716 may be a Dynamic Random Access Memory (DRAM), a Static Random Access Memory (SRAM), a flash memory, or any other memory capable of working with the one or more of the CPU 702 or the GPUs 706 and with the high speed internal bus 710. The memory 716 is distinct from a further data storage 718 that may be used for long term storage. The memory 716 may include instruction(s) 720 and/or data 722. One or more of the instructions or data may be run or executed by the one or more of the CPU 702 or the GPUs 706. The memory may be accessible via a memory controller 724.

In one example, the CPUs 702 of the computing features 700 may include any of a PENTIUM® Processor family from Intel®, including Itanium®, XScale™ and/or StrongARM™; Intel's Core™, Nervana™, or Xeon™ based processors. However, other CPUs, such as AMD®'s Ryzen series, Intel's Core i series, Qualcomm®'s Snapdragon® series, and Samsung®'s Exynos series may also be used. In a further example, the computing features 700 may include GPUs 706, such as from NVIDIA®'s GeForce series or AMD®'s Radeon series.

Further, systems of computers may form part or all of the computing features 700 and may have other types of processors than listed above. These computers may be workstations, set-top boxes, or have similar computing capabilities as these devices and may also be used to perform aspects of the system and method herein. The computing features 700 may run or execute aspects of an operating system, such as UNIX®, Linux®, or WINDOWS®, and can perform embedded software, as well as support different types of user interfaces, including graphical user interfaces (GUI).

The computing features 700 may be provided via fixed and mobile devices. These devices include personal computers, workstations, handheld devices, virtual devices, or datacenters. Some examples of mobile devices include laptops, cellular phones, smartphones, Internet Protocol (IP) devices, digital cameras, personal digital assistants ("PDAs"), and other handheld PCs. The computing features 700 may be performed on virtual devices that are supported by embedded applications. The embedded applications may include a microcontroller, a digital signal processor (DSP), an SOC, network computers, network hubs, switches, routers, gateways, or any other system that may perform one or more instructions described herein.

The computing features 700 may be supported by one or more of the CPU 702 or the GPUs 706 that may include a complex instruction set computer (CISC) microprocessor, a reduced instruction set computing (RISC) microprocessor, a very long instruction word (VLIW) microprocessor, a processor capable of combining instruction sets, or any other processor device. Further examples of a processor device is an application specific integrated circuit (ASIC), a DSP, or a DPU. As illustrated in FIG. 7, one or more of the CPU 502 or the GPUs 506 may be associated together and may be associated with other components using a high speed internal bus 710. The high speed bus 710 is capable of transmitting data and commands between the one or more of the CPU 702 or the GPUs 706 and between other components in the illustrated computing features 700.

The one or more of the CPU 702 or the GPUs 706 may include cache type memory. For example, one or more of the CPU 702 or the GPUs 706 may include a Level 1 (L1) internal cache memory (cache) 712. In a further example, the one or more of the CPU 702 or the GPUs 706 may include one or more internal cache. A multiple cache arrangement may be provided as a hierarchy or as levels of internal cache. As used herein, a cache is a type of memory that may reside internally or externally relative to each of the one or more of the CPU 702 or the GPUs 706. There is also possibility for a combination of an internal and external cache based in part on an application of the computing features 700. Further, the one or more of the CPU 702 or the GPUs 706 may include a registry or a register 714. The registry or register may be a file structure to retain different types of data. For example, there may be different types of the registry or registers. These may include integer registers, floating point (FP) registers, status registers, and an instruction pointer register.

A system logic chip capable of performing as the memory controller 724 may be provided between to a high speed internal bus 710 and the memory 716. The memory controller 724 and the one or more of the CPU 702 or the GPUs 706 may communicate via the high speed internal bus 710 using a high bandwidth memory path. This allows the one or more of the CPU 702 or the GPUs 706 to access the instruction(s) 720 and the data 722 for performing the testing described herein. The memory controller 724 may also be able to direct signals of data between one or more of the CPU 702 or the GPUs 706, the memory 716, and other components in the computing features 700.

In addition to the above, the memory controller 724 may also bridge signals of data between a high speed internal bus 710, a memory 716, and an input/output (I/O) controller 726. The memory controller 724 may include different types of ports, including ports for interfacing with one or more of the CPU 702 or the GPUs 706. At least one of the GPUs 706 may perform as a graphics controller for one of the input/output (I/O) device 728 which may include a display. The memory controller 724 may be associated with the memory 716 through a memory path 730 that is high bandwidth memory path. Although illustrated as coupled together via a high speed internal bus 710, the memory controller 724 may be coupled to one of the GPUs 706 via an Accelerated Graphics Port (AGP) interconnect 732. One or more of the CPU 702 may be coupled to one or more of the GPUs 706 directly or indirectly via a peripheral component interconnect express (PCIe®) interconnect standard. In addition, a network controller 734 may also be coupled to one or more of the CPU 702 or the GPUs 706 via a different interface that is also a PCIe interconnect standard. Further, some or all of the interconnected devices or chips herein may be provided via SoC. Therefore, some or all of the interconnected devices of FIG. 7 may be interconnected with proprietary interconnects. However, some or all of the interconnected devices of FIG. 7 may be interconnected by a combination of standardized interconnects (such as, PCIe and compute express link or CXL®) and the proprietary interconnects.

The computing features 700 herein may use the I/O controller 726 as a proprietary interface to bring together the memory controller 724, the network controller 734, and one or more of the other I/O devices 728. One or more of the controllers herein may include direct connections to some I/O devices 728 via a local I/O bus that may include a high-speed I/O bus for connecting peripherals to a memory 716, a chipset, and to one or more of the CPU 702 or the GPUs 706. The I/O devices 728 may include an audio controller, a firmware hub (such as a, a basic input/output system or BIOS), a transceiver, the data storage 718, a display, and any I/O controllers. The I/O controllers 726 may include input devices, including a keyboard interface, a mouse interface, a touch interface, a gesture interface, and one or more expansion ports, including a Universal Serial Bus (USB) port. The data storage 718 may include a flash memory storage, a hard disk drive, or any removable non-transitory storage media having instructions thereon. For example, a CD-ROM device, a flash memory device, or other mass storage device Other variations are within spirit of present description. Thus, while the described techniques are susceptible to various modifications and alternative constructions, certain illustrated embodiments thereof are shown in drawings and have been described above in detail. It should be understood, however, that there is no intention to limit description to specific form or forms described, but on contrary, intention is to cover all modifications, alternative constructions, and equivalents falling within spirit and scope of description, as defined in appended claims.

Use of terms "a" and "an" and "the" and similar referents in context of describing embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Use of any and all examples, or exemplary language (e.g., "such as") provided herein, is intended merely to better illuminate embodiments of the description and does not pose a limitation on scope of description unless otherwise claimed. No language in specification should be construed as indicating any non-claimed element as essential to practice of the description.

Although descriptions herein set forth example implementations of described techniques, other architectures may be used to implement described functionality, and are intended to be within scope of this description. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are described as exemplary forms of implementing the claims.

What is claimed is:

1. A support structure, comprising:
   an outer wall;
   a fluid-permeable inner wall; and
   one or more ports extending through the outer wall and directing a barrier fluid to the fluid-permeable inner wall, wherein the barrier fluid is able to flow through the fluid-permeable inner wall to form a barrier between the fluid-permeable inner wall and a material positioned within the support structure.

2. The support structure of claim 1, wherein the fluid-permeable inner wall further comprises:
   a first opening having a first flow axis perpendicular to a central axis of the support structure; and
   a second opening having a second flow axis arranged at an obtuse angle or an acute angle to the central axis of the support structure.

3. The support structure of claim 2, wherein the second opening has a second opening flow rate configured to induce mixing of the material positioned within the support structure.

4. The support structure of claim 1, wherein the barrier fluid is at a barrier fluid temperature at least one of greater than or less than the material and the barrier fluid is configured to moderate a material temperature of the material.

5. The support structure of claim 1, wherein the material is a gas, liquid, solid, plasma, or combination thereof and the barrier fluid is at least one of a gas or a liquid.

6. The support structure of claim 1, wherein the material is at least one of flowing through the support structure or stagnant within the support structure.

7. The support structure of claim 1, wherein one or more components of the support structure are formed using an additive manufacturing process.

8. A container, comprising:
   an outer wall;
   an inner wall; and
   one or more ports extending through the outer wall to transport a gas to a first side of the inner wall, wherein the gas is able to flow through the inner wall to form a gas barrier on a second side of the inner wall to block a material on the second side of the inner wall from contacting the inner wall.

9. The container of claim 8, wherein the outer wall and the inner wall are integrally formed using an additive manufacturing process.

10. The container of claim 8, wherein the inner wall includes one or more flow openings.

11. The container of claim 10, wherein a first density of flow openings at a first portion of the inner wall is different from a second density of flow openings at a second portion of the inner wall.

12. The container of claim 10, wherein the one or more flow openings include a first set of flow openings to form the gas barrier and a second set of flow openings configured to drive rotation of the material within the container.

13. The container of claim 8, wherein the gas is inert.

14. The container of claim 8, further comprising a void between the outer wall and the inner wall to collect the gas.

15. The container of claim 8, wherein the material within the container is at least one of a corrosive material or an abrasive material.

16. The container of claim 8, wherein the outer wall is formed from a different material than the inner wall.

17. The container of claim 8, wherein the gas is an accelerant that reacts with the material within the container.

18. A method, comprising:
forming an outer wall for a containment structure;
forming one or more ports extending through the outer wall;
forming an inner wall having one or more openings radially inward from the outer wall and fluidly coupled to the one or more ports;
causing a gas to flow through the one or more ports and through the one or more openings; and
causing the gas to form a gas barrier between the inner wall and a material within the containment structure.

19. The method of claim 18, further comprising:
causing the gas to mix with the material.

20. The method of claim 18, wherein the one or more openings are particularly arranged, based at least, on one or more of an expected pressure or an expected flow rate.

\* \* \* \* \*